United States Patent
Pinski

(10) Patent No.: US 10,692,136 B2
(45) Date of Patent: Jun. 23, 2020

(54) SYSTEM AND METHOD FOR OPENING AN ACCOUNT USING A MOBILE DEVICE

(71) Applicant: Capital One, NA, McLean, VA (US)

(72) Inventor: David Pinski, Narberth, PA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 1074 days.

(21) Appl. No.: 13/624,206

(22) Filed: Sep. 21, 2012

(65) Prior Publication Data
US 2014/0089153 A1    Mar. 27, 2014

(51) Int. Cl.
G06Q 40/02    (2012.01)
G06Q 20/40    (2012.01)
G06F 3/02     (2006.01)

(52) U.S. Cl.
CPC .................. *G06Q 40/02* (2013.01)

(58) Field of Classification Search
CPC .......... G06Q 40/02; G06Q 20/40; G06F 3/02
USPC .......................................................... 705/35
See application file for complete search history.

(56) References Cited

U.S. PATENT DOCUMENTS

2001/0051924 A1* 12/2001 Uberti ............... G06Q 20/4014
                                                    705/44
2007/0138260 A1* 6/2007 Keys ..................... G07F 7/127
                                                    235/380
2009/0307140 A1* 12/2009 Mardikar ........... G06Q 20/3223
                                                    705/71
2013/0346302 A1* 12/2013 Purves ................ G06Q 20/102
                                                    705/40

OTHER PUBLICATIONS

Ben Dodson et al., "Snap2Pass: Consumer-Friendly Challenge-Response Authentication with a Phone", Apr. 3, 2010, Stanford University, Computer Science Department (Year: 2010).*

* cited by examiner

*Primary Examiner* — Ryan D Donlon
*Assistant Examiner* — Irene S Kang
(74) *Attorney, Agent, or Firm* — Troutman Sanders LLP; Christopher J. Forstner; John A. Morrissett

(57) ABSTRACT

A system and method for opening an account at an institution. First information of a user may be received from a mobile device, and second information of the user may be received from the mobile device, the second information being converted from an image of a primary document. The first information may then be validated against the second information, and an account opened for the user if the first information validates against the second information. The step of receiving first information may include receiving optical character recognition data converted from an image of a secondary document such as a driver's license. The step of receiving second information may include receiving optical character recognition data converted from an image of the primary document such as a personal check, a debit card, a credit card, etc.

32 Claims, 4 Drawing Sheets

SYSTEM AND METHOD FOR OPENING AN ACCOUNT USING A MOBILE DEVICE

BACKGROUND

Wireless communication has increased exponentially over the past few years. Mobile devices such as cellular phones, Personal Digital Assistants (PDAs), tablets, and other wirelessly enabled devices have successfully penetrated and been adopted by the general consumer market. Individuals have come to enjoy the convenience, flexibility and mobility of wireless devices as a means to facilitate communications. Individuals also enjoy the benefits and convenience of having financial accounts, electronic money accounts, general services accounts, or any private or public services accounts, which facilitate their purchasing goods/services, saving money and accessing personal records.

In the case of personal, financial or services accounts with a financial institution or entity, conventional methods of opening such accounts are performed in-person at the financial institution or a branch thereof or are performed online via the Internet. Exemplary accounts may be, but are not limited to, checking accounts, savings accounts, brokerage accounts, and the like. In each case the individual is queried for personal information and requested to manually complete a series of forms either on physical paper or on a computer screen by entering personal data such as name, address, social security number, bank routing data, and the like. These conventional methods, however, are cumbersome and possess a high abandonment rate. Further, individuals may encounter a myriad of problems in opening accounts ranging from the length of time to complete the forms to an unavailability of access to requested information (e.g., bank routing data).

Thus, there remains a need to overcome conventional limitations and provide a system and method to forego requiring an individual to undergo the inconvenience of going to a specific institution to open an account and/or manually fill out necessary information regarding the individual while maintaining a secure and encrypted wireless channel to open the account.

SUMMARY

The present disclosure is directed generally to systems and methods for opening an account via a mobile device. One embodiment of the present subject matter provides a method of opening an account at an institution. The method may include receiving first information of a user from a mobile device and receiving second information of the user from the mobile device, the second information being converted from an image of a primary document. The first information may be validated against the second information, and an account opened for the user if the first information validates against the second information.

Another embodiment of the present subject matter provides a method of opening an account at an institution. The method may include receiving first information of a user from a mobile device, the first information being information converted from an image of a primary document and displaying the first information to the user on the mobile device for validation thereof. The first information may be flagged for additional review if the user changes any of the displayed first information. The method may also include receiving second information of the user from a mobile device, the second information being converted from an image of a secondary document and displaying the second information to the user on the mobile device for validation thereof. The second information may be flagged for additional review if the user changes any of the displayed second information. The first information may then be validated against the second information, and an account opened for the user if the first information validates against the second information.

A further embodiment of the present subject matter provides a system for opening an account at an institution. The system may include one or more servers each having a computer readable storage medium. The computer readable storage medium may include instructions stored thereon for causing the one or more servers to receive first information of a user from a mobile device and receive second information of the user from the mobile device, the second information being converted from an image of a primary document. The computer readable storage medium may also include instructions stored thereon to validate the first information against the second information using a validating service and to open an account for the user if the first information validates against the second information.

An additional embodiment of the present subject matter provides a device for opening an account at an institution. The device may include an image capturing mechanism and a computer readable storage medium, the computer readable storage medium having instructions stored thereon for causing the device to receive first information of a user provided by the image capturing mechanism and transmit the first information. The computer readable storage medium may also include instructions to receive second information of the user provided by the image capturing mechanism, the second information being converted from an image of a primary document and transmit the second information where the first information is validated against the second information and an account opened for the user if the first information validates against the second information.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for opening an account using a mobile device are provided.

As more consumers switch to a mobile device as their primary means of interacting with the Internet, it is increasingly important for financial institutions or entities to have the ability to originate a banking relationship on these mobile devices. Embodiments of the present subject matter may be utilized to provide data of a user or individual to open an account at an entity, custodian or institution. An exemplary custodian may be, for example, a financial institution such as a bank, brokerage firm or other similar entity. Of course, a custodian may also be any agent or any agent's computer or computers acting as an intermediary between two other parties or computers of two other parties where access, such as via the Internet, to certain information or data is designed to be limited, regardless of whether or not the information or data is confidential. A custodian may also include a secure operating system executing on a microprocessor-based computer terminal or device capable of interactive network communications, or wireless device that connects to, and communicates through, the Internet using, for example, a wireless access protocol (WAP) or other protocol, and utilizing operating-system controls to limit access to data.

Figure 1:
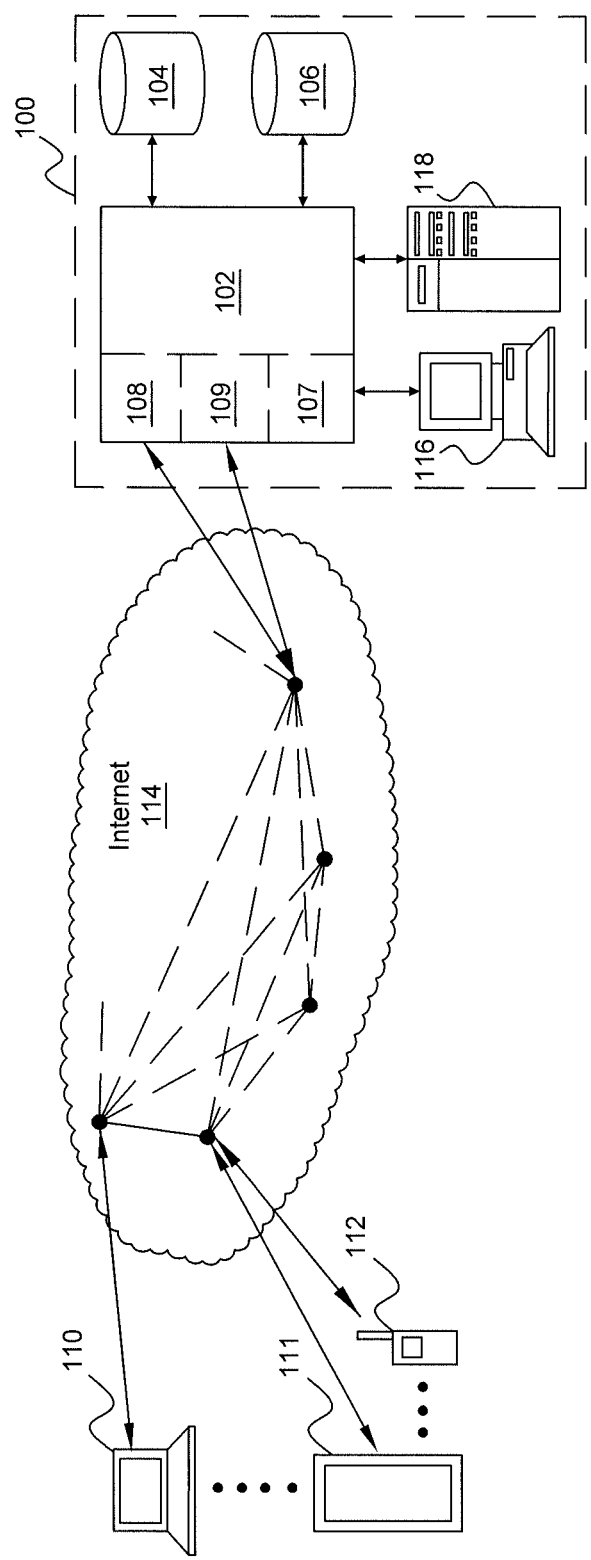
FIG. 1 is an illustration of an exemplary wireless banking system connected to a plurality of devices.

FIG. 1 is an illustration of an exemplary wireless banking system 100 connected to a plurality of devices 110, 111, 112. The wireless banking system 100 may be employed by a custodian described above or any agent or intermediary thereof, for example. An exemplary wireless banking system 100 may be selectively coupled to a plurality of devices through the Internet 114 or another known means. Exemplary devices may be desktop or laptop computers 110, tablets 111, mobile devices 112 such as cell phones, smart phones, and the like. Each of the devices 110, 111, 112 may have various devices connected to their local computer systems, such as scanners, cameras, webcams, barcode readers, printers, finger print scanners, mouse devices, keyboards, and other interface devices. The wireless banking system 100 may be protected from network attacks by a piece of software or specialized hardware, commonly known as a firewall. It is understood that a firewall may be used to block network connections from the outside world to the wireless banking system 100 inside the firewall. It is also understood that firewalls are often governed by a set of rules that specify what IP addresses, ports, and even types of traffic are allowed to connect to machines inside the firewall. It is also understood that other network security defense tools may be employed as part of a defense-in-depth strategy to secure the wireless banking system 100 including, but not limited to, intranet subnet partitioning, intrusion detection or host-based intrusion prevention systems. Communications between any or all of the devices to an exemplary wireless banking system 100 may be via a transport layer security (TLS) tunnel or secure sockets layer (SSL) tunnel to prevent snooping and/or alternation of such communications and respective information. These tunnels are exemplary only as other cryptographic protocols may be employed to provide communications security over the Internet.

An exemplary wireless banking system 100 may include a processing unit 102 coupled to one or more data storage units 104, 106. The processing unit 102 may provide front-end graphical user interfaces (GUI), e.g., customer GUI 108 and a service provider GUI 109, as well as back-end GUIs 107 to a device 110, 111, 112 or to a local computer 116. The GUIs may take the form of, for example, a webpage that is displayed using a browser program local to the device 110, 111, 112 or to the local computer 116. It is understood that the wireless banking system 100 may be implemented on one or more computers 116, servers 118, or like devices. For example, a wireless banking system 100 may include servers programmed or partitioned based on permitted access to the data of a custodian or customer and may include communications servers to facilitate communications between the devices 110, 111, 112 and the system 100. It should be noted that the terms "customer," "individual" and "user" are used interchangeably herein and such use should not limit the scope of the claims appended herewith. Front- and back-end GUIs 107, 108, 109 may be portal pages that include various content retrieved from the one or more data storage devices 104, 106. As used herein, "portal" may be general-purpose Internet portals and/or may include GUIs that are of interest to specific, limited audiences and that provide a user access to a plurality of different kinds of related or unrelated information, links and tools as described below. It should also be noted that the terms "webpage" and "website" may be used interchangeably herein and such use should not limit the scope of the claims appended herewith.

A user or customer may gain access to the wireless banking system 100 by using a device 110, 111, 112, 116, programmed with a Web browser or other software, to locate and select (such as by clicking with a mouse) a particular webpage. Application Programming Interfaces (APIs) may be employed to provide connectivity between applications resident on the devices 110, 111, 112, 116 and underlying data in the system 100 or services provided by an entity, custodian or institution. The content of the webpage may be located on the one or more data storage devices 104, 106. The device 110, 111, 112, 116 may be a microprocessor-based computer terminal, a pager adaptable to communicate through the Internet, Kiosks with Internet access, personal digital assistants (PDAs) (e.g., a PALM device manufactured by Palm, Inc., IPAQ device available from Compaq, iPHONE from Apple or BLACKBERRY from RIM), cellular phone, tablet, or other devices capable of interactive network communications, such as an electronic personal planner. Of course, such devices 110, 111, 112, 116 may be wireless or wire-line that connect to and communicate through the Internet. As mentioned above, an exemplary wireless banking system 100 may provide separate features and functionality for users thereof, including customers and service providers, as well as back-end users that manage the wireless banking system 100.

Figure 2:
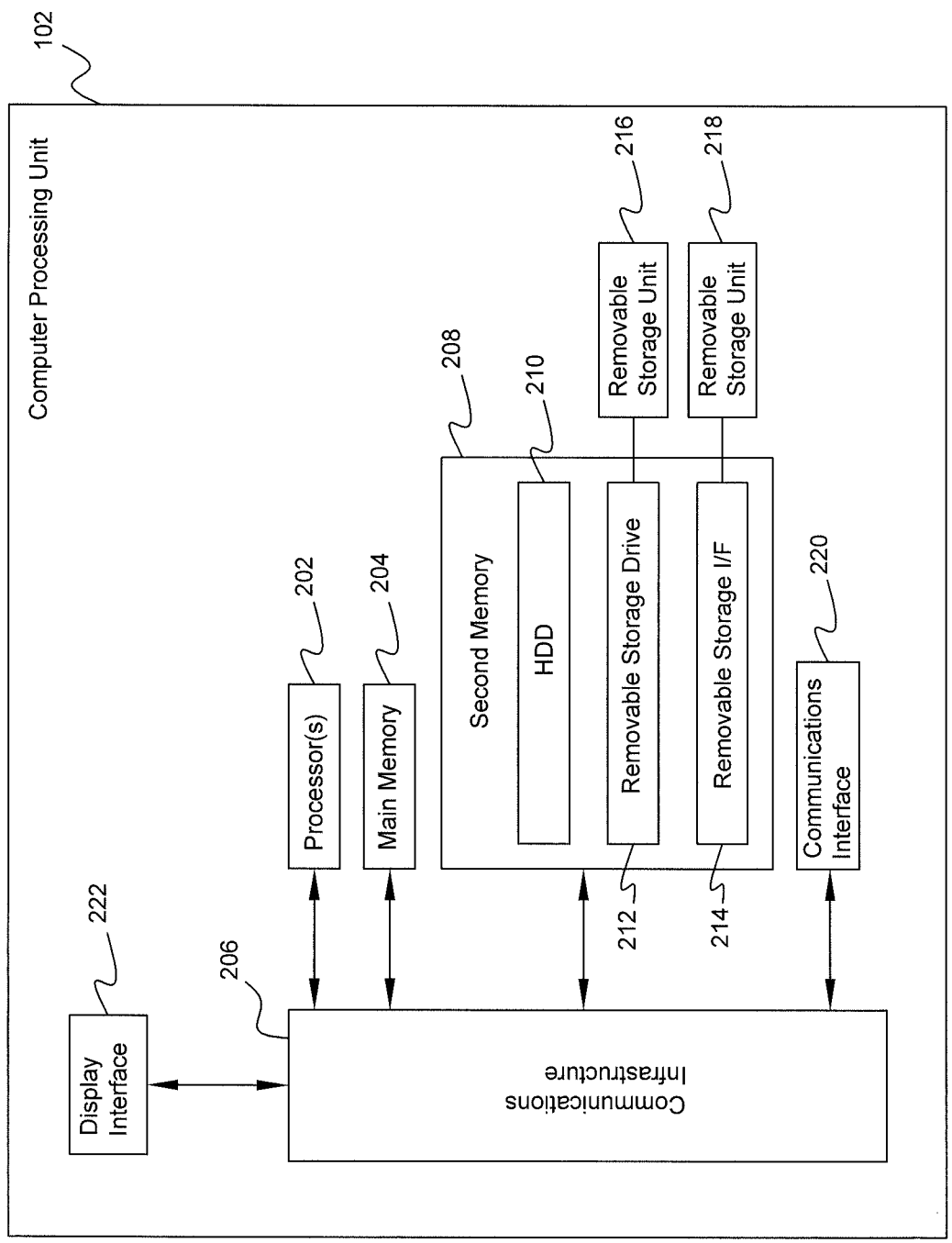
FIG. 2 is an illustration of an architecture of a computer processing unit.

FIG. 2 is an illustration of an architecture of a computer processing unit 102 configured to implement the algorithms and software programming associated with the present disclosure. This unit may be a standalone unit, may be a server or portion thereof. As illustrated in FIG. 2, the computer processor unit 102 may include one or more processors 202. The processor 202 may be connected to a communication infrastructure 206 (e.g., a communications bus, cross-over bar, server or network). As discussed above, the computer processing unit 102 may include a display interface that forwards graphics, text, and other data from the communication infrastructure (or from a frame buffer not shown) for display on the front- and back-end GUIs 107, 108, 109 and as retrieved from the one or more data storage devices 104, 106.

The computer processing unit 102 may also include a main memory 204, such as a random access memory (RAM), and a secondary memory 208. The secondary memory 208 may include, for example, a hard disk drive (HDD) 210 and/or removable storage drive 212, which may represent a floppy disk drive, a magnetic tape drive, an optical disk drive, or the like. The removable storage drive 212 may read from and/or write to a removable storage unit 216. The removable storage unit 216 may be a floppy disk, magnetic tape, optical disk, or the like. As will be understood, the removable storage unit 216 may include a computer readable storage medium having stored therein computer software and/or data.

In alternative embodiments, the secondary memory 208 may include other similar devices for allowing computer programs or other instructions to be loaded into the computer processing unit 102. The secondary memory 208 may include a removable storage unit 218 and a corresponding interface 214. Examples of such removable storage units include, but are not limited to, USB or flash drives, which allow software and data to be transferred from the removable storage unit 218 to the computer processing unit 102.

The computer processing unit 102 may also include a communications interface 220 allowing software and data to be transferred between computer processing unit 102 and external devices. Examples of a communications interface 220 may include a modem, Ethernet card, wireless network card, a Personal Computer Memory Card International Association (PCMCIA) slot and card, or the like. Software and data transferred via the communications interface 220 may be in the form of signals, which may be electronic, electromagnetic, optical, or the like that are capable of being received by the communications interface 220. These signals may be provided to the communications interface 220 via a communications path (e.g., channel), which may be implemented using wire, cable, fiber optics, a telephone line, a cellular link, a radio frequency (RF) link and other communication channels.

The terms "computer program medium" and "computer readable storage medium" may generally refer to media such as a removable storage drive 212, a hard disk installed in a hard disk drive 210, etc. These computer program products may provide software to computer processing unit 102. Computer programs (also referred to as computer control logic) may also be stored in the main memory 204, secondary memory 208 and/or data storage devices 104, 106. Computer programs may also be received via the communications interface 220. Such computer programs, when executed by a processor, specifically enable the computer processing unit 102 to perform features of the methods discussed herein. In an embodiment implemented using software, the software may be stored in a computer program product and loaded into computer processing unit 102 using a removable storage drive 212, hard drive 210, or communications interface 220. The software, when executed by a processor 202, causes the processor 202 to specifically perform the functions described herein.

Institutions or entities having the capability of creating new customer accounts using a mobile device provides significant advantages to these institutions. For example, these capabilities may be employed to improve the experience of a user or individual of a traditional personal computer by requiring little or no user data entry.

One embodiment of the present subject matter may allow an individual to access an exemplary banking system utilizing a mobile device such as, but not limited to, a laptop computer, tablet, cell phone, smart phone, and the like. Of course, these devices may include applicable operating systems thereon (e.g., iOS, Android, Windows, etc.). As discussed above, exemplary devices may include peripheral equipment including, but not limited to, a camera, webcam, or a scanner, to name a few to, allowing a user thereof to employ character recognition of specific documents to automate opening of accounts with a respective institution.

By the way of a non-limiting example, an iPhone or iPad (or other device) user may download an application from a third party or an institution for the purpose of opening an account, or in the alternative, may visit a website of the institution or third party. The user may then be asked to capture an image of a primary document or portions thereof (e.g., one or both sides of the document) such as, but not limited to, a driver's license or other identity-verifying document having personal information of the user. Driver's licenses are largely standardized in the United States and generally include the respective person's name, address and other identifying information. For example, many states present a PDF417 standardized stacked linear barcode on the respective state-issued driver's license. This barcode contains identifying information in a digital format. While several examples in this disclosure may utilize a driver's license as an exemplary verification document, the claims appended herewith should not be so limited. Through a scanner, webcam or camera on the iPhone or iPad, the user may capture his identifying information on the driver's license. Employing an exemplary Optical Character Recognition (OCR) or other image capturing process, this identifying information may be converted from image or digital data to textual data by an application or program resident on the iPhone or iPad. The converted data may then be displayed back to the iPhone or iPad user for validation thereof. In the instance that the data is incorrect and requires correction, the user may employ a keyboard, keypad or touch-screen to update the data as necessary. In one embodiment, if these corrections are made by the user and/or cause the data to deviate from the printed license or document, a flag may be issued noting that the data and/or transaction should be reviewed.

The user may then prepare or provide a secondary document, such as a personal check, a credit card, a debit card, etc. issued from another or the same institution. If the instance the secondary document is a check, it may be made out to the user and for an initial amount of deposit in the account to be opened (e.g., a minimum opening account balance or otherwise). The check or secondary document may include thereon additional identifying information such as, but not limited to, the user's social security number (SSN). Using, for example, Remote Deposit Capture (RDC), an image of a portion of the check (e.g., one or both sides of the document) may be captured by the user and employed to read the amount of the check, the Magnetic Ink Character Recognition (MICR) line at the bottom of the check, and other identifying information (in this example, the user's SSN) contained on the check and convert such information to data. As is known, the MICR line contains bank routing data used for a depositing of the check. This converted data may then be displayed back to the iPhone or iPad user for validation. In the instance that the data is incorrect and requires correction, the user may employ a keyboard, keypad or touch-screen to update the data as necessary. In one embodiment, if these corrections are made by the user and/or cause the data to deviate from the printed license, a flag may be issued noting that the data and/or transaction should be reviewed. Based on the data captured from the primary and secondary documents, enough user-specific information data may be obtained to open an account. In some instances, additional customer validation may be necessary but may not require data entry beyond selecting options from a list. While exemplary embodiments have been described utilizing image recognition, the claims appended herewith should not be so limited as other methods of user or identity verification may be employed such as, but not limited to, voice and biometric recognition processes, to name a few.

In one embodiment, a validation service may be automatically employed to independently validate the information to be received by the institution. For example, an exemplary system may validate information or data inputted by or received from the user in real-time or near real-time using a service such as Early Warning so that the account to be opened, linked to another account where funds can be transferred, and may be fully operational at the end of the process. An exemplary account may be, but is not limited to a financial account, an electronic money account, a general services account, a checking account, a savings account, a brokerage account, and the like. Early Warning is a financial industry consortium that validates account ownership to protect customers or users and financial institutions and to prevent account abuse, fraud and/or perform identity verification. Of course, if the user or customer's financial institution is not a member of the Early Warning network, account ownership validation may be performed by other methods such as a successful clearance of the check, a linked ownership test deposit (LOTD), and the like. Data captured from the primary document or secondary document may be submitted by the mobile device to the Early Warning network or another validation service for validation against the other respective document and/or other information contained, for example, in a database, or to the Early Warning network or another validation service via the institution using an exemplary banking system described above. In another embodiment, the opening process of the account may include a real-time or near real-time downloading of a payment card (e.g., credit card, debit card and the like) linked to the newly opened account to a mobile wallet. This mobile wallet may thus be available for transactions against the newly opened account based upon available balance or credit line.

Figure 3:
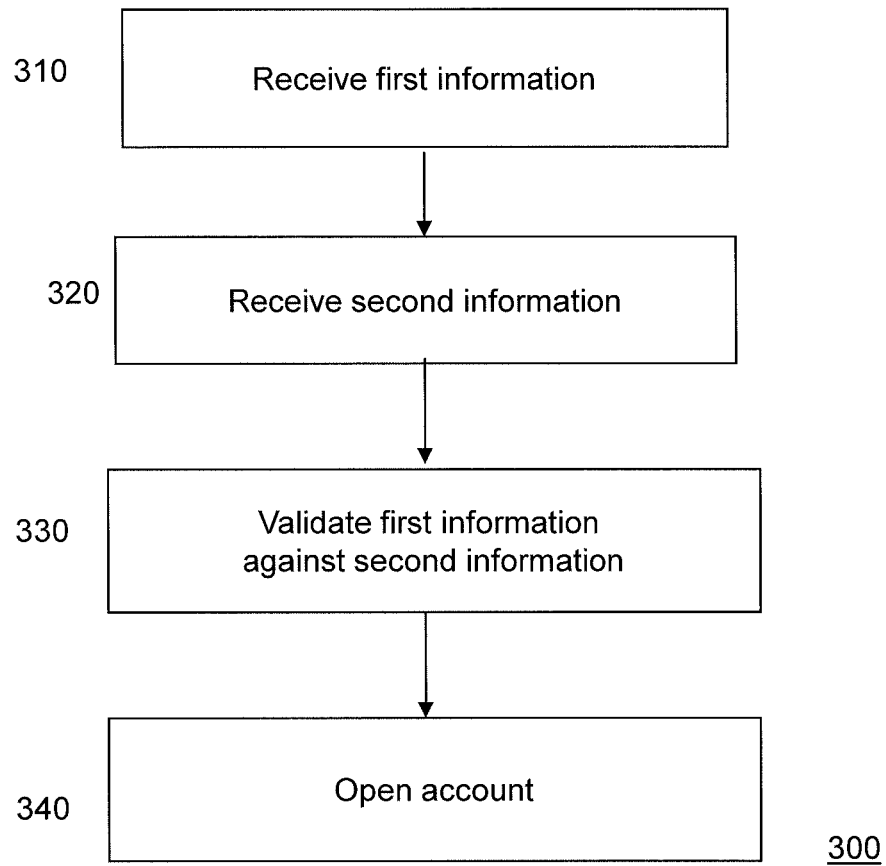
FIG. 3 is a simplified block diagram of one embodiment of the present subject matter.

FIG. 3 is a simplified block diagram of one embodiment of the present subject matter. With reference to FIG. 3, a method 300 is provided for opening an account at an institution. The method 300 may include, at step 310, receiving first information of a user from a mobile device. An exemplary device may be a microprocessor-based computer terminal, a microprocessor-based server, a mobile device, a pager, a kiosk, a personal digital assistant, a cellular phone, a tablet, an electronic personal planner, and a smart phone, to name a few. This first information may be, but is not limited to voice information, image information, biometric information, textual information, and converted information. In one embodiment, step 310 may include receiving optical character recognition data converted from an image of a secondary document. An exemplary secondary document may be a driver's license of the user. In another embodiment, the method 300 may include displaying the first information to the user for validation thereof and flagging the first information for additional review if the user changes any of the displayed first information. It should be noted that the terms information and data are used interchangeably in this disclosure and the claims appended herewith should not be limited by such use.

At step 320, the method may include receiving second information of the user from the mobile device, the second information being converted from an image of a primary document. In one embodiment, step 320 may include receiving optical character recognition data converted from an image of the primary document. An exemplary primary document may be, but is not limited to, a personal check, a debit card, a credit card, a document containing the social security number of the user, and a document containing a Magnetic Ink Character Recognition line. Further, the second information may include an amount to be deposited in the opened account. In another embodiment, the method 300 may include displaying the second information to the user for validation thereof and flagging the second information for additional review if the user changes any of the displayed second information.

At step 330, the first information may be validated against the second information, and at step 340, an account may be opened for the user if the first information validates against the second information. The opened account may be, but is not limited to, a financial account, an electronic money account, a general services account, a checking account, a savings account, or a brokerage account. In one embodiment, step 330 may be performed using a process such as an Early Warning validation process, a linked ownership test deposit process, providing one or more know your customer questions, providing terms and conditions to the user, or combinations thereof.

Figure 4:
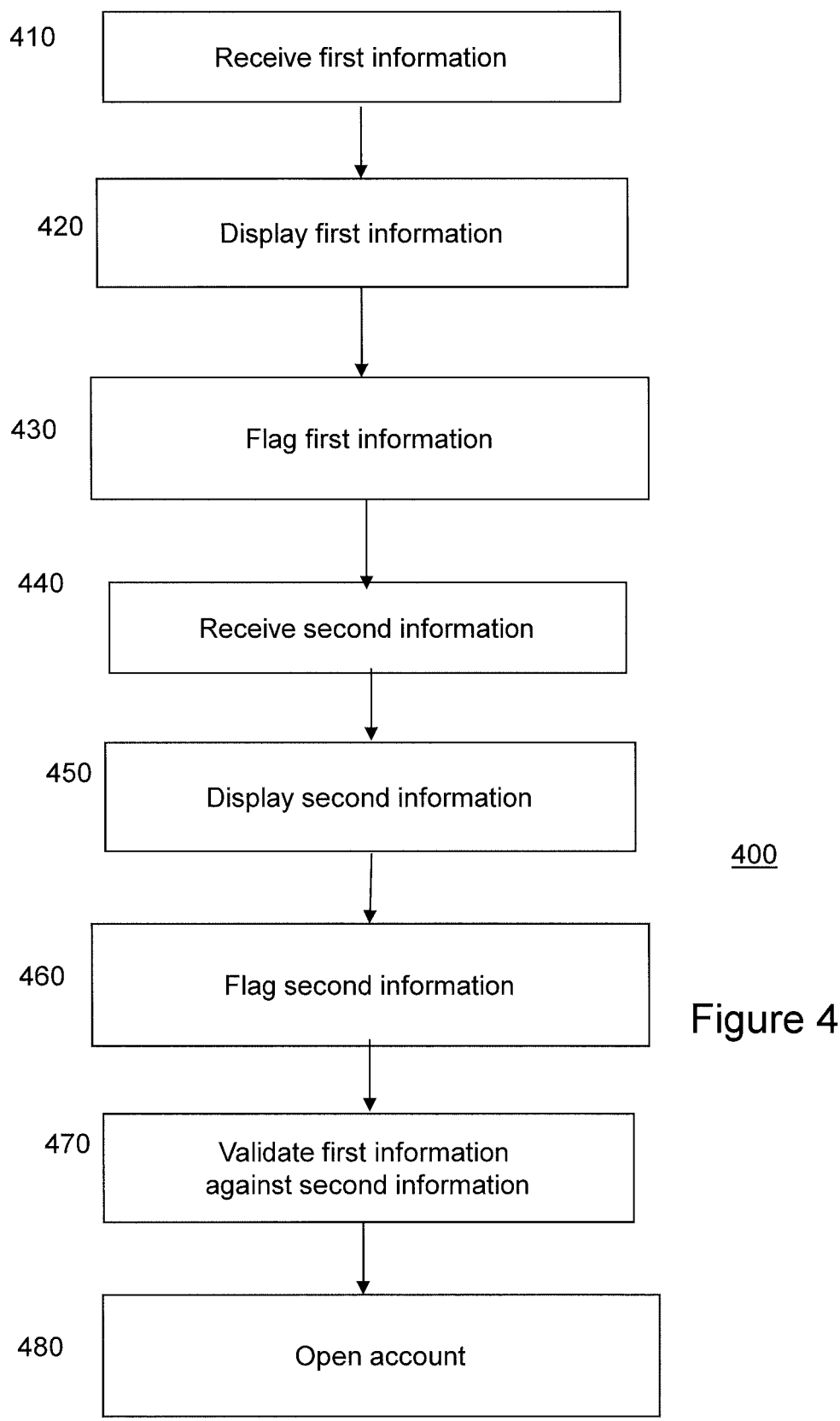
FIG. 4 is a simplified block diagram of another embodiment of the present subject matter.

FIG. 4 is a simplified block diagram of another embodiment of the present subject matter. With reference to FIG. 4, a method 400 is provided for opening an account at an institution. The method 400 may include at step 410 receiving first information of a user from a mobile device, the first information being information converted from an image of a primary document. In one embodiment, step 410 may include receiving optical character recognition data converted from an image of the primary document. An exemplary primary document may be a driver's license of the user. Further, an exemplary device may be a microprocessor-based computer terminal, a microprocessor-based server, a mobile device, a pager, a kiosk, a personal digital assistant, a cellular phone, a tablet, an electronic personal planner, or a smart phone. The first information may be displayed at step 420 to the user on the mobile device for validation thereof. This first information may be flagged for additional review if the user changes any of the displayed first information at step 430.

The method 400 may also include at step 440 receiving second information of the user from a mobile device, the second information being converted from an image of a secondary document. In another embodiment, step 440 may include receiving optical character recognition data converted from an image of the secondary document. An exemplary secondary document may be a personal check, a debit card, a credit card, a document containing the social security number of the user, or a document containing a Magnetic Ink Character Recognition line. The second information may be displayed at step 450 to the user on the mobile device for validation thereof. This second information may be flagged for additional review if the user changes any of the displayed second information at step 460.

The first information may then be validated against the second information at step 470, and an account opened for the user if the first information validates against the second information at step 480. In one embodiment, step 470 may be performed using a process such as an Early Warning validation process, a linked ownership test deposit process, providing one or more know your customer questions, providing terms and conditions to the user, and combinations thereof. In one embodiment, the method 400 may further include the step of depositing an amount into the opened account, the amount included in the second information. An exemplary account may be, but is not limited to, a financial account, an electronic money account, a general services account, a checking account, a savings account, or a brokerage account.

While portions of this disclosure have been described with reference to a financial institution, this should not limit the scope of the claims appended herewith, as the present subject matter may find utility in many different instances where it is necessary to open up an account utilizing personal or confidential information of a user or individual via a mobile device.

The present disclosure may be implemented by a general purpose computer or server programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, a data processing apparatus. The tangible program carrier may be a computer readable medium. As discussed above, the computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, server, or multiple processors, computers or servers. These apparatus, devices and machines may include (in addition to hardware) code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by and/or implemented as special purpose logic circuitry, e.g., a field programmable gate array (FPGA) or an application specific integrated circuit (ASIC). These processors and/or circuitry may be resident on an exemplary mobile device described above or on servers in an exemplary wireless banking system. For example, an exemplary system for opening an account at an institution may include one or more servers each having a computer readable storage medium, the computer readable storage medium comprising instructions stored thereon for causing the one or more servers to receive first information (e.g., voice information, image information, biometric information, textual information, or converted information) of a user from a mobile device and receive second information of the user from the mobile device, the second information being converted from an image of a primary document (e.g., a personal check, a debit card, a credit card, a document containing the social security number of the user, or a document containing a Magnetic Ink Character Recognition line). The computer readable storage medium may also include instructions to validate the first information against the second information using a validating service and open an account for the user if the first information validates against the second information. By way of a further example, an exemplary device for opening an account at an institution may include an image capturing mechanism and a computer readable storage medium, the computer readable storage medium having instructions stored thereon for causing the device to receive first information of a user provided by the image capturing mechanism and transmit the first information. The computer readable storage medium may also include instructions to receive second information of the user provided by the image capturing mechanism, the second information being converted from an image of a primary document and to transmit the second information, where the first information is validated against the second information and an account opened for the user if the first information validates against the second information.

Processors suitable for the execution of a computer program include, by way of example, both general and special purpose microprocessors, and any one or more processors of any kind of digital computer. Generally, a processor will receive instructions and data from a read only memory or a random access memory or both. While the essential elements of a computer are a processor for performing instructions and one or more data memory devices for storing instructions and data, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

As discussed above, embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described is this specification, or any combination of one or more such back end, middleware, or front end components. The components of the system may be interconnected by any form or medium of digital data communication, e.g., a communication network. Examples of communication networks include a local area network (LAN) and a wide area network (WAN), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-4, a system and method for opening an account using a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What I claim is:

1. A computer-implemented method of automatically opening an account at an institution, the method comprising:
   receiving, at a network communications interface of a server and from a mobile device of a user not having a preexisting account with the institution via an established cryptographic tunnel, user identification information of the user, the user identification information being captured by the mobile device;
   identifying, with a programmed processor of the server, an indication that the user changed a portion of the received user identification information via the mobile device;
   in response to identifying the indication, the programmed processor of the server flagging the received user identification information for review;
   receiving, at the network communications interface of the server and from the mobile device via the established cryptographic tunnel, primary document information of the user from the network communications interface of the mobile device via the established cryptographic tunnel, the primary document information being converted from an image of a primary document captured by an image capturing mechanism of the mobile device;
   validating, by the programmed processor of the server, the received user identification information against the received primary document information in real-time; and
   automatically opening, with the programmed processor of the server, an account for the user in response to successfully validating the received user identification information against the received primary document information.

2. The method of claim 1, wherein the user identification information is selected from the group consisting of voice information, image information, biometric information, textual information, and converted information.

3. The method of claim 1, wherein receiving the user identification information further comprises receiving, at the network communications interface of the server, optical character recognition data converted from an image of a primary document captured by the image capturing mechanism of the mobile device via the established cryptographic tunnel.

4. The method of claim 3, wherein the primary document is a driver's license of the user.

5. The method of claim 1, wherein receiving primary document information further comprises receiving, at the network communications interface of the server, optical character recognition data converted from the image of the primary document captured by the image capturing mechanism of the mobile device via the established cryptographic tunnel.

6. The method of claim 5, wherein the primary document is selected from the group consisting of a personal check, a debit card, a credit card, a document containing a social security number of the user, and a document containing a Magnetic Ink Character Recognition line.

7. The method of claim 5, wherein the primary document information includes an amount to be deposited in the automatically opened account by the programmed processor of the server.

8. The method of claim 1, further comprising the steps of:
identifying, with the programmed processor of the server, an indication that the user, via the mobile device, changed any of the primary document information converted from the image of the primary document captured by the image capturing mechanism of the mobile device in the received primary document information via the established cryptographic tunnel;
receiving, from the mobile device via the established cryptographic tunnel, input that corresponds to correcting the changed received primary document information associated with the identified indication; and
in response to identifying the indication, the programmed processor of the server flagging the received primary document information for review.

9. The method of claim 1, wherein the automatically opened account is selected from the group consisting of a financial account, an electronic money account, a general services account, a checking account, a savings account, and a brokerage account.

10. The method of claim 1, wherein the mobile device is selected from the group consisting of a pager, a personal digital assistant, a cellular phone, a tablet, an electronic personal planner, and a smart phone.

11. The method of claim 1, wherein validating the user identification information against the primary document information is performed by the programmed processor of the server using a process selected from the group consisting of a third party validation process, a linked ownership test deposit process, validating responses received from the network communications interface of the mobile device to one or more know your customer questions, providing validating responses received from the network communications interface of the mobile device to terms and conditions transmitted to the network communications interface of the mobile device of the user, and combinations thereof.

12. The method of claim 1, wherein the step of automatically opening an account further comprises the steps of:
linking, with the programmed processor of the server, information for a payment card of the user to the automatically opened account;
transmitting, from the network communications interface of the server, the linked information to a mobile wallet operating on the mobile device; and
making the mobile wallet available for transactions against the automatically opened account, with the programmed processor of the server, and in response to the transmitted linked information.

13. A system for automatically opening an account at an institution comprising:
one or more servers each having a computer readable storage medium, the computer readable storage medium comprising instructions stored thereon for causing the one or more servers to:
receive, at a network communications interface of the one or more servers and from a mobile device of a user not having a preexisting account with the institution via an established cryptographic tunnel, user identification information of the user, the user identification information being captured by the mobile device;
identify an indication that the user changed a portion of the received user identification information via the mobile device;
in response to identifying the indication, flagging the received user identification information for review;
receive, at the network communications interface of the one or more servers and from the mobile device via the established cryptographic tunnel, primary document information of the user from the network communications interface of the mobile device via the established cryptographic tunnel, the primary document information being converted from an image of a primary document captured by an image capturing mechanism of the mobile device;
the computer readable storage medium further comprising instructions stored thereon for causing a programmed processor of the one or more servers to:
validate, by the programmed processor of the one or more servers, the received user identification information against the received primary document information using a validating service in real-time; and
automatically open an account for the user in response to successfully validating the received user identification information against the received primary document information.

14. The system of claim 13, wherein the validating service is provided from the group consisting of a third party validation network remote from the system, a linked ownership test deposit, validating responses received from the network communications interface of the mobile device to one or more know your customer questions, validating responses received from the network communications interface of the mobile device to one or more terms and conditions transmitted to the network communications interface of the mobile device of the user, and combinations thereof.

15. The system of claim 13, wherein the user identification information is selected from the group consisting of voice information, image information, biometric information, textual information, and converted information.

16. The system of claim 13, wherein the instructions to receive first information further comprises instructions to receive, at the network communications interface of the one or more servers, optical character recognition data converted from an image of a primary document captured by the image capturing mechanism of the mobile device via the established cryptographic tunnel.

17. The system of claim 16, wherein the primary document is a driver's license of the user.

18. The system of claim 13, wherein the instructions to receive primary document information further comprises instructions to receive, at the network communications interface of the one or more servers, optical character recognition data converted from an image of the primary document captured by the image capturing mechanism of the mobile device via the established cryptographic tunnel.

19. The system of claim 18, wherein the primary document is selected from the group consisting of a personal check, a debit card, a credit card, a document containing a social security number of the user, and a document containing a Magnetic Ink Character Recognition line.

20. The system of claim 18, wherein the primary document information includes an amount to be deposited in the automatically opened account by the programmed processor of the one or more servers.

21. The system of claim 13, wherein the automatically opened account is selected from the group consisting of a financial account, an electronic money account, a general services account, a checking account, a savings account, and a brokerage account.

22. The system of claim 13, wherein the mobile device is selected from the group consisting of a pager, a personal digital assistant, a cellular phone, a tablet, an electronic personal planner, and a smart phone.

23. A mobile device for automatically opening an account at an institution comprising:
- an input/output interface;
- an image capturing mechanism; and
- a computer readable storage medium, the computer readable storage medium comprising instructions stored thereon for causing a programmed processor of the mobile device to:
  - receive user identification information of a user not having a preexisting account with the institution at the mobile device;
  - create a flag to indicate that the user identification information requires review in response to receiving a change to the user identification information via the input/output interface;
  - transmit the user identification information of the user and the flag to a network communications interface of one or more servers via an established cryptographic tunnel;
  - transmit, to the network communications interface of the one or more servers via the established cryptographic tunnel, input that corresponds to correcting the changed received user identification information associated with the flag;
  - receive, from the user, captured image information of a primary document of the user from the image capturing mechanism;
  - convert the received image information into primary document information of the user;
  - transmit the primary document information to the network communications interface of the one or more servers via the established cryptographic tunnel;
  - receive, at a network communications interface of the mobile device, an indication as to whether the transmitted user identification information has been validated, by the one or more servers, against the transmitted primary document information; and
  - responsive to the received indication that the user identification information is successfully validated in real-time against the primary document information, receive, at the network communications interface of the mobile device, account information for a new account automatically opened for the user.

24. The mobile device of claim 23, wherein the computer readable storage medium further includes instructions to cause the programmed processor of the mobile device to:
- create a flag to indicate that the primary document information requires review in response to receiving a change to any of the primary document information via the input/output interface; and
- transmit the created flag and input that corresponds to correcting the changed received primary document information associated with the created flag to the network communications interface of the one or more servers via the established cryptographic tunnel.

25. The mobile device of claim 23, wherein the user identification information is selected from the group consisting of voice information, image information, biometric information, textual information, converted information.

26. The mobile device of claim 23, wherein the instructions to receive user identification information further comprises instructions to cause the processor of the mobile device to:
- receive captured image information of a primary document from the image capturing mechanism; and
- convert the received image into the user identification information comprising optical character recognition data.

27. The mobile device of claim 26, wherein the primary document is a driver's license of the user.

28. The mobile device of claim 23, wherein the primary document information comprises optical character recognition data converted from the image of the primary document.

29. The mobile device of claim 28, wherein the primary document is selected from the group consisting of a personal check, a debit card, a credit card, a document containing a social security number of the user, and a document containing a Magnetic Ink Character Recognition line.

30. The mobile device of claim 23, wherein the automatically opened account is selected from the group consisting of a financial account, an electronic money account, a general services account, a checking account, a savings account, and a brokerage account.

31. The mobile device of claim 23, wherein the mobile device is selected from the group consisting of a pager, a personal digital assistant, a cellular phone, a tablet, an electronic personal planner, and a smart phone.

32. The mobile device of claim 23, wherein the mobile device further comprises a mobile wallet and the computer readable storage medium further includes instructions to cause the programmed processor of the mobile device to:
- receive, at the network communications interface of the mobile device, information for a payment card of the user linked to the automatically opened new account; and
- making the mobile wallet available for transactions against the automatically opened new account in response to receiving the linked information.

* * * * *